United States Patent
Yamamura et al.

(10) Patent No.: US 9,071,639 B2
(45) Date of Patent: Jun. 30, 2015

(54) UNAUTHORIZED APPLICATION DETECTION SYSTEM AND METHOD

(71) Applicants: Motoaki Yamamura, Tokyo (JP); Masata Nishida, Tokyo (JP)

(72) Inventors: Motoaki Yamamura, Tokyo (JP); Masata Nishida, Tokyo (JP)

(73) Assignee: SECUREBRAIN CORPORATION, Tokyo (JP)

( * ) Notice: Subject to any disclaimer, the term of this patent is extended or adjusted under 35 U.S.C. 154(b) by 0 days.

(21) Appl. No.: 14/356,825

(22) PCT Filed: Nov. 9, 2012

(86) PCT No.: PCT/JP2012/079084
§ 371 (c)(1),
(2) Date: May 7, 2014

(87) PCT Pub. No.: WO2013/069758
PCT Pub. Date: May 16, 2013

(65) Prior Publication Data
US 2014/0298468 A1 Oct. 2, 2014

(30) Foreign Application Priority Data
Nov. 10, 2011 (JP) ................................. 2011-246193

(51) Int. Cl.
*H04L 29/06* (2006.01)
*G06F 21/55* (2013.01)
*G06F 21/57* (2013.01)

(52) U.S. Cl.
CPC .......... *H04L 63/1466* (2013.01); *G06F 21/552* (2013.01); *G06F 21/577* (2013.01); *H04L 63/1433* (2013.01)

(58) Field of Classification Search
CPC . G06F 21/552; G06F 21/577; H04L 63/1466; H04L 63/1433
USPC .......................................................... 726/23
See application file for complete search history.

(56) References Cited

U.S. PATENT DOCUMENTS

| | | | |
|---|---|---|---|
| 2009/0019546 A1* | 1/2009 | Park et al. ........................ | 726/24 |
| 2010/0077481 A1* | 3/2010 | Polyakov et al. ................ | 726/24 |
| 2011/0055925 A1* | 3/2011 | Jakobsson ....................... | 726/25 |
| 2013/0031599 A1* | 1/2013 | Luna et al. ........................ | 726/1 |

* cited by examiner

*Primary Examiner* — Kambiz Zand
*Assistant Examiner* — Aubrey Wyszynski
(74) *Attorney, Agent, or Firm* — Davis, Malm & D'Agostine, P.C.

(57) ABSTRACT

The objective of the present invention is to provide technology for detecting malicious action of an application upon a terminal device using a low load as well as to increase accuracy of detection; in particular, to provide technology capable of performing detection even regarding an application which has been deleted upon the terminal device. A change in the installation state of an application in a terminal device is detected, upon which information for the installed application is reported to a fraud detection server so as to be recorded. In addition, a predetermined feature value based on an application file or component files configuring a package of the application is reported to the fraud detection server. The feature value is associated with the malicious action of the application so as to be registered in an application DB, whereupon if malicious action of the application is detected, fraud detection information is transmitted to the terminal device. When the fraud detection information is received, predetermined response processing is performed upon the terminal device.

11 Claims, 6 Drawing Sheets

UNAUTHORIZED APPLICATION DETECTION SYSTEM AND METHOD

TECHNICAL FIELD

The present invention relates to a system and method for detecting the malicious action of an application installed on a terminal device and, more particularly, to detection technology combined with a fraud detection server.

BACKGROUND ART

Recently, as portable terminal devices represented as smart phones have higher performance, various applications are installed in the portable terminal devices as in computers. Meanwhile, it is an important subject to detect an application that illegally operates because an application operating in a portable terminal device includes a computer virus or malware that executes a malicious action.

In software for detecting a computer virus operating in a computer, etc., a method of detecting whether a malicious application has not been installed and whether a suspicious movement has been checked using virus detection software operating in a computer is commonly used.

In a portable terminal device, however, schemes different from those of a computer have been proposed because the portable terminal device has limited hardware resources.

For example, Patent Document 1 discloses technology in which a user's mobile phone accesses a content server before downloading content, the content server sends the content to a virus check server, and the virus check server checks the content.

Patent Document 2 discloses a system in which a monitoring device monitors the software state of a terminal device that has accessed a network. The monitoring device of this system includes a first DB for storing information about the features of software that is defined to include information about the features of a file, that is, a cause of weakness, or a file generated when malware is infected. Furthermore, the terminal device includes a second DB for sequentially obtaining information about the features of files therein and storing the obtained information. The monitoring device sends the feature information stored in the first DB, together with a verification request, to the terminal device over a network. The terminal device verifies whether or not a file related to the feature information is present by searching the second DB and sends a result of the search to the monitoring device. The monitoring device determines the weakness of the terminal device or a malware infection situation based on the received verification result and prevents the expansion of damage by controlling access.

Patent Document 3 discloses technology in which a mail storage unit for storing the same mail as mail transmitted from a mail server to a client terminal is provided and a virus hidden in the mail stored in the mail storage unit is detected after a virus definition file has been updated.

Patent Document 4 discloses technology in which information about virus check means and a virus definition file used to perform a virus check on a file once are attached and whether it is necessary to execute a virus check or not is determined by determining whether or not the same virus check means and virus definition file are used in a next virus check.

PRIOR ART DOCUMENT

Patent Document

Japanese Patent Application Publication No 2002-197006
Japanese Patent Application Publication No 2006-40196
Japanese Patent Application Publication No 2007-018182
Japanese Patent Application Publication No 2007-200102

DISCLOSURE

Technical Problem

The technology described in Patent Document 1 is problematic since time is taken until downloading because the virus check server checks a virus upon downloading and a mobile phone cannot be protected from a virus not detected upon check.

In the technology described in Patent Document 2, the terminal device can be powerfully monitored by the monitoring device, but it is not practical to send all pieces of feature information to the terminal device in the current situation in which numerous applications are circulated because the terminal device is configured to check whether or not feature information is identical with feature information transmitted by the monitoring device.

The technology of Patent Document 3 is excellent in that a virus can be checked always using the latest virus definition file, but might not be considered as an efficient method because a great memory region is required to store all bulky mail or applications.

The technology of Patent Document 4 has a dominant position in that a virus can be checked at high speed on a computer having low performance, but does not provide technology oriented to terminal devices used by unspecified users or technology for detecting the malicious action of an application even after the application is deleted from a terminal device.

The present invention has been made in view of the above problems occurring in the prior art, and an object of the present invention is to provide technology for detecting the malicious action of an application on a terminal device with a low load and increasing accuracy of detection. In particular, the present invention provides technology capable of detecting even an application deleted from a terminal device.

Technical Solution

To achieve the above objects, the present invention provides a malicious application detection system including a terminal on which a user is able to properly install an application and a fraud detection server for detecting the malicious action of the application installed on the terminal.

The terminal includes an installation state detection unit for detecting a change in an installation state of the application; an installation notification unit for notifying the fraud detection server of information about the installed application when the installation state is changed; a feature value calculation unit for calculating a specific feature value based on a file of the application or element files that form a package of the application; a feature value transmission unit for notifying the fraud detection server of the information about the application and the feature value of the application; a fraud detection information reception unit for receiving fraud detection information from the fraud detection server when the malicious action of the application is detected; and the anti-malicious action unit for performing specific countermeasures in the terminal when the fraud detection information is received.

Meanwhile, the fraud detection server includes an installation notification reception unit for receiving the information about the installed application from the installation notification unit of the terminal; a feature value reception unit for receiving the feature value from the feature value transmission unit of the terminal; a fraud detection unit for detecting the malicious action of a registered application within the server or externally obtaining and detecting the malicious action of the registered application; a fraud detection result recording unit for registering the feature value, associated with the information about the malicious action, with an application DB; and a fraud detection information transmission unit for sending fraud detection information to the terminal when the malicious action of the application is detected at least.

The fraud detection server includes an application information search unit for searching the application DB in order to check whether or not the notified information about the application has been registered and a registration state notification unit for notifying the terminal of a result of the check regarding whether or not the notified information about the application has been registered. The feature value transmission unit of the terminal may be configured to send the information about the application and the feature value of the application to the fraud detection server depending on whether or not the information about the application has been registered with the fraud detection server.

The fraud detection result recording unit of the fraud detection server may be configured to record the installation state of an application in each terminal on the application DB in response to an installation notification from the terminal. The fraud detection information transmission unit of the fraud detection server may be configured to send fraud detection information even after an application is deleted from the terminal when the malicious action of the application is detected by the fraud detection unit.

The application DB may be configured to be separated into a terminal-based application DB on which an installation state is recorded according to each terminal and the malicious action database on which a feature value associated with information about the malicious action is recorded.

The fraud detection server includes a feature value calculation unit for calculating a specific feature value based on a specific file of an input application or element files that form a package of the application. The fraud detection unit may detect the malicious action of the application, and the fraud detection result recording unit may register the feature value associated with information about the malicious action with the application DB.

The present invention may be provided only as the terminal used in the malicious application detection system. Furthermore, the present invention may be provided only as the fraud detection server.

Furthermore, the present invention may provide a method of detecting a malicious application installed on a terminal using the terminal on which a user is able to properly install an application and a fraud detection server for detecting the malicious action of the application installed on the terminal. The present invention includes the following steps.

The present invention is characterized in that it includes:
An installation state detection step of detecting a change in the installation state of the application installed on the terminal
An installation notification step of notifying the fraud detection server of information about the installed application when the installation state is changed
A feature value transmission step of notifying the fraud detection server of a specific feature value based on a file of the application or element files that form a package of the application A fraud detection result recording step of registering the feature value, associated with the information about the malicious action, with an application DB
A fraud detection information transmission step of sending fraud detection information to the terminal when the malicious action of the application is detected at least
A fraud countermeasures processing step of performing specific countermeasures in the terminal when the fraud detection information is received.

The installation notification step further includes an application information search step of checking, by the fraud detection server, whether or not the information about the application received from the terminal has been registered with the application DB and a registration state notification step of notifying the terminal of a result of the check. In the feature value transmission step, the fraud detection server may be notified of a specific feature value based on a file of an application that has not been registered or element files that form a package of the application.

The fraud detection server may be configured to record the installation state of an application on the application DB according to each terminal in response to an installation notification from the terminal, and the fraud detection server may be configured to send fraud detection information to a terminal even after an application is deleted from the terminal when the malicious action of the application is detected.

The fraud detection server may be configured to calculate a specific feature value based on a specific file of an input application or element files that form a package of the application, detect the malicious action of the application, and register the feature value associated with information about the malicious action with the application DB.

Advantageous Effects

The present invention has the following advantages by adopting the aforementioned construction.

That is, a load in the terminal device can be minimized because the terminal device has only to perform a simple process, such as the calculation of feature values, only when the installation state of an application has changed. In particular, the present invention contributes to power reduction that is important in the terminal device.

The latest signature file can always be used because the malicious action of an application is detected by the fraud detection server, and the improvement of accuracy of detection and high-speed detection can be realized because the server having a high processing capability executes the detection of a malicious action.

Since the installation state of an application in the terminal device is recorded on the fraud detection server, the terminal device can be informed that the malicious action of an application has been checked by the latest signature file so that countermeasures can be executed even after the application has been deleted when the malicious action of the application is checked by the latest signature file.

DESCRIPTION OF REFERENCE NUMERALS OF PRINCIPAL ELEMENTS IN THE DRAWINGS

1 Terminal device
10 Installation state detection unit
11 Installation notification unit
12 Feature value calculation unit
13 Feature value transmission unit
14 Fraud detection information reception unit
15 Fraud countermeasures unit
2 Fraud detection server
20 Installation notification reception unit
21 Application information search unit
22 Registration state notification unit
23 Feature value reception unit
24 Fraud detection unit
25 Fraud detection result recording unit
26 Fraud detection information transmission unit
27 Feature value calculation unit
28 Application DB
3 Network

MODE FOR INVENTION

Hereinafter, embodiments of the present invention are described using the drawings. The present invention is not limited to the following embodiments and may be properly implemented without departing from the scope of the claims.

Figure 1:
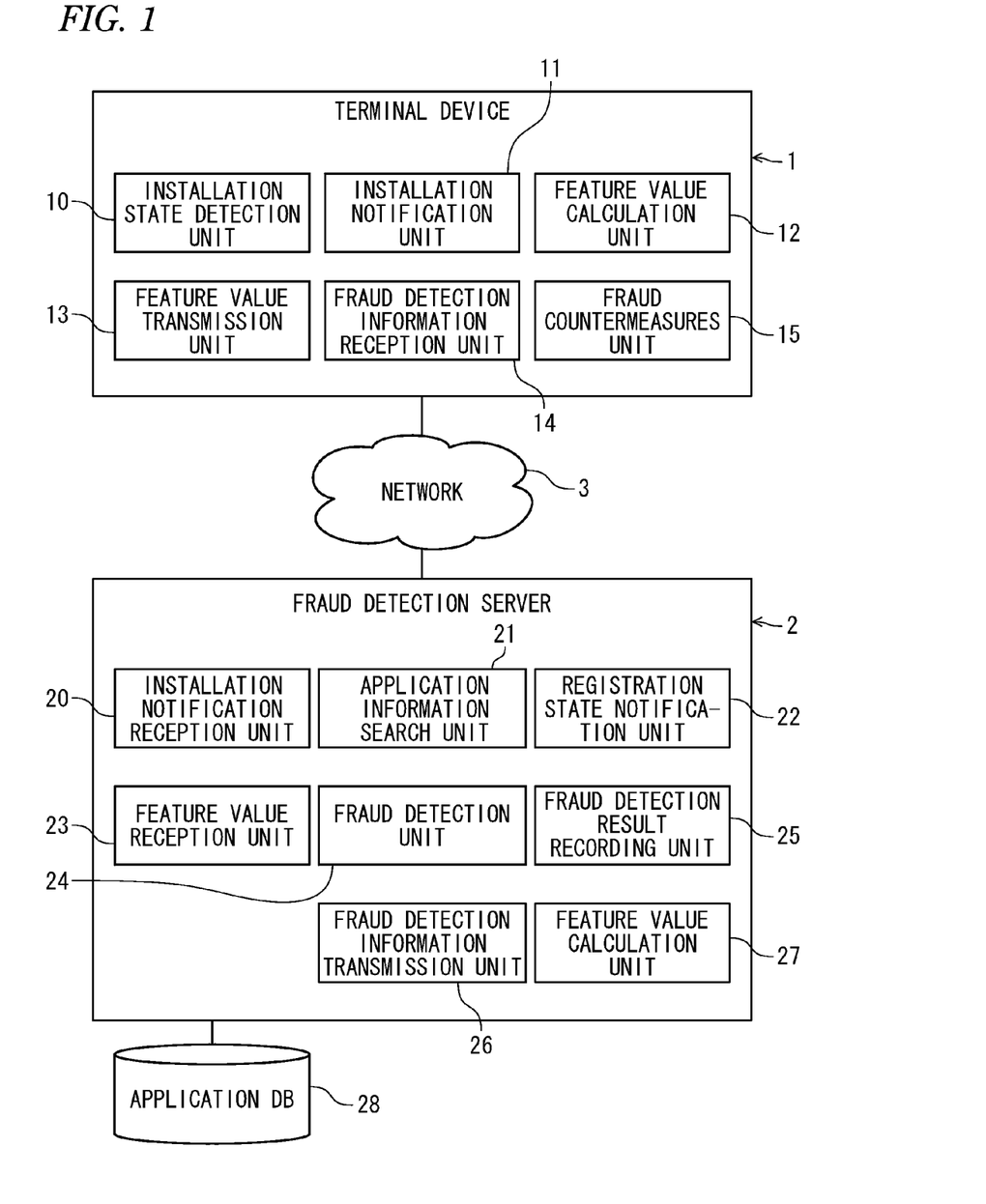
FIG. 1 is a general diagram of a malicious application detection system of the present invention.

FIG. 1 is a general diagram of a malicious application detection system of the present invention. The present system includes a terminal device (hereinafter called a terminal) 1 on which a user may properly install applications and a fraud detection server (hereinafter referred to as a server) 2 for detecting the malicious action of each application installed on the terminal device.

The terminal 1 and the server 2 are connected over a network 3, such as the Internet, a LAN, or a mobile phone network.

The terminal 1 has been basically assumed to be a portable terminal, such as a known smart phone, a mobile phone, or a tablet PC, but may be a computer. Such devices, as noted, are equipped with access means with a network, a CPU, memory, display means, such as a liquid crystal screen, input means, such as a keyboard and a touch panel, etc.

Furthermore, the server 2 may be easily configured as a common computer or a server, and they are equipped with a CPU, memory, external storage means, such as a hard disk, display means, and input means.

The terminal 1 is equipped with subsequent processing means through cooperation with the CPU and the memory.

First, an installation state detection unit 10 detects a change in the installation state of an application installed on the terminal 1. When the installation state is changed, an installation notification unit 11 notifies the server 2 of information about the installed application over the network 3.

A feature value calculation unit 12 calculates a specific feature value based on a file of the installed application or an element file that forms a package of the application. In the present embodiment, a hash value, etc. may be used as the feature value.

A feature value transmission unit 13 notifies the server 2 of the calculated feature value over the network 3.

The terminal 1 further includes a fraud detection information reception unit 14 for receiving fraud detection information when the malicious action of an application is detected by the server 2 and a fraud countermeasures unit 15 for performing specific countermeasures in the terminal device when the fraud detection information is received.

The server 2 includes subsequent processing means through cooperation between the CPU and memory.

That is, an installation notification reception unit 20 receives information about an installed application from the installation notification unit 11 of the terminal. An application information search unit 21 checks whether or not the information about the application has been registered with an application DB. A registration state notification unit 22 notifies the terminal 1 of a result of the check regarding whether or not the information about the application has been registered with the application DB.

A feature value reception unit 23 receives a feature value from the feature value transmission unit 13 of the terminal 1. The server 2 further includes a fraud detection unit 24 for detecting the malicious action of a registered application therein or obtaining the malicious action of an application from the outside, a fraud detection result recording unit 25 for registering a feature value, associated with information about the malicious action, in the application DB 28, and a fraud detection information transmission unit 26 for sending fraud detection information to the terminal 1.

As another embodiment, a feature value calculation unit 27 may be included in the server 2.

Figure 2:
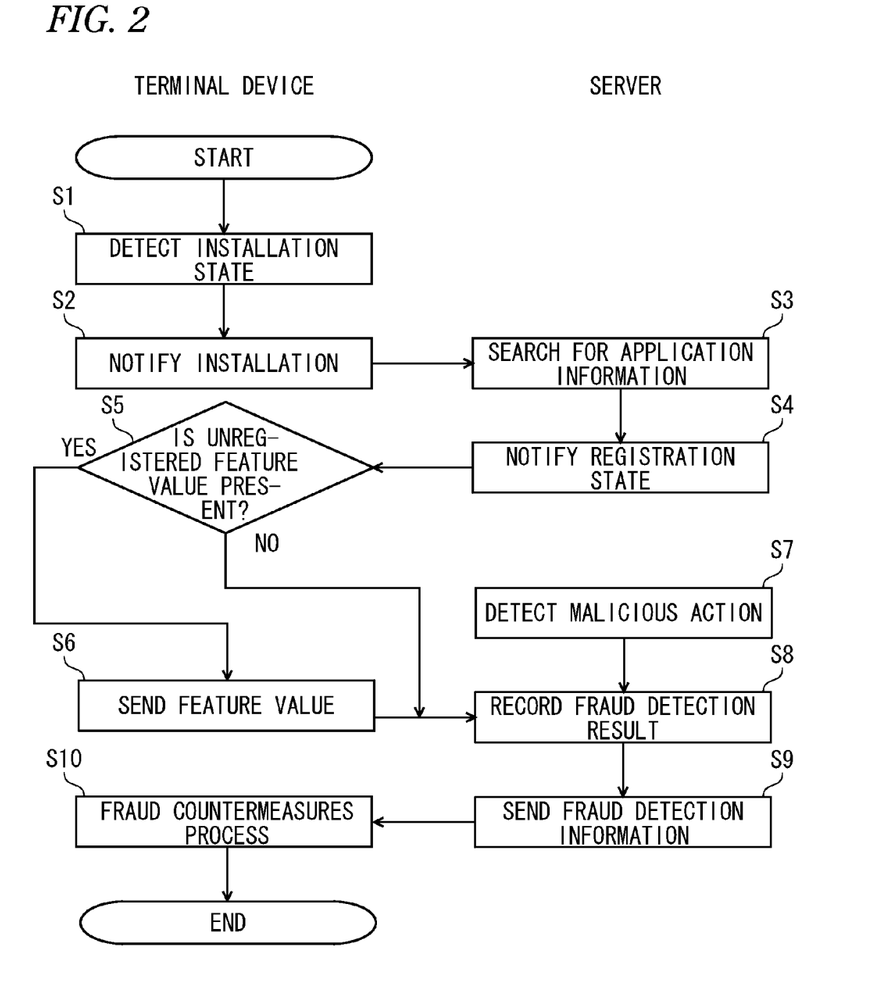
FIG. 2 is a flowchart illustrating a malicious application detection method of the present invention.

FIG. 2 is a flowchart illustrating a malicious application detection method of the present invention. A detailed embodiment of the present invention is described using the flowchart.

First, the detection of a malicious application is started when the terminal 1 detects the installation state of the application (an installation state detection step: S1).

The installation state refers to various states of an application in a terminal, such as the installation, deletion, and update of a version of the application, and a change from a beta edition to a normal edition. The processing of the installation state detection unit 10 may be always performed in the background, but in order to reduce a processing load, the installation state detection unit 10 may detect an installation state in response to an event generated when the installation state is changed.

When an installation state, such as a case where an application is installed, is detected, the installation notification unit 11 performs an installation notification on the installation notification reception unit 20 (S2).

In the present invention, a feature value may be transmitted irrespective of whether or not information about an application has been registered with the server 2. In order to reduce processing and traffic in the terminal, however, an application information registration state in the server 2 is preferably searched for.

To this end, the application information search unit 21 of the server 2 searches the application DB 28 in order to check whether or not the received information about the application has been registered. (an application information search step: S3)

Furthermore, the registration state notification unit 22 notifies the terminal 1 of the registration state (S4). The terminal 1 may perform different processing depending on the registration state.

That is, the processing of the terminal is different depending on whether or not an application has been registered with the server 2 (S5). The feature value calculation unit 12 previously calculates the feature value of an application that has not been registered and sends the calculated feature value to the server (S6). The feature value calculation unit 12 does not send the feature value of an application that has been registered to the server.

As described above, processing speed can be improved and traffic can be reduced because the feature value transmission unit 13 sends an unregistered feature value to the feature value reception unit 23 only when the unregistered feature value is present.

Information about an application whose feature value has been transmitted, together with the application, is recorded on the application DB 28.

In this case, if the fraud detection unit 24 has obtained information about the malicious action of the application, the fraud detection result recording unit 25 records the information about the malicious action on the application DB 28 along with the feature value. (a fraud detection result recording step: S8)

In this case, the fraud detection unit 24 may randomly use a known method of detecting a virus, malware, etc., and a description of a method of detecting a malicious action is omitted. The fraud detection unit 24 itself may detect the malicious action of an application, and it may be configured to obtain information from the information database of a malicious application that is separately provided.

The detection of the fraud detection unit 24 may be performed at a specific interval and may be performed whenever a new application is registered. Update with the latest signature file is performed each time.

Information about a malicious action is not limited to a case where the malicious action has been accepted, and may include information whose malicious action has not been accepted. Furthermore, if a malicious action may not be certainly checked, corresponding information may be recorded as incomplete information.

Furthermore, if the detection of the fraud detection unit 24 is not immediately executed, a malicious action may be registered as being not detected right after a feature value is received, and the application DB 28 may be then updated when the malicious action is detected.

The fraud detection information transmission unit 26 sends information regarding whether or not the malicious action of the application has been accepted to the fraud detection information reception unit 14 based on a detection result of the malicious action. The fraud detection information transmission unit 26 may send the information about the malicious action only when the malicious action has been accepted and may send information regarding whether or not the malicious action is present. (a fraud detection information transmission step: S9)

When the fraud detection information reception unit 14 receives the malicious action of the application, the fraud countermeasures unit 15 performs a fraud countermeasure (S10).

The fraud countermeasures process may include displaying a screen that prompts a user to delete the application, an automatic deletion process, etc.

Furthermore, if the malicious action is not accepted, the countermeasures, such as displaying contents indicating that the application is safe, may be performed.

The construction of the present invention has been described as above, and a detailed processing method is described using a sequence diagram. In the present embodiment, a terminal, such as a smart phone using Android (a registered trade mark), is used as the terminal, and an example in which the package structure of an application complies with Android OS is described.

Figure 3:
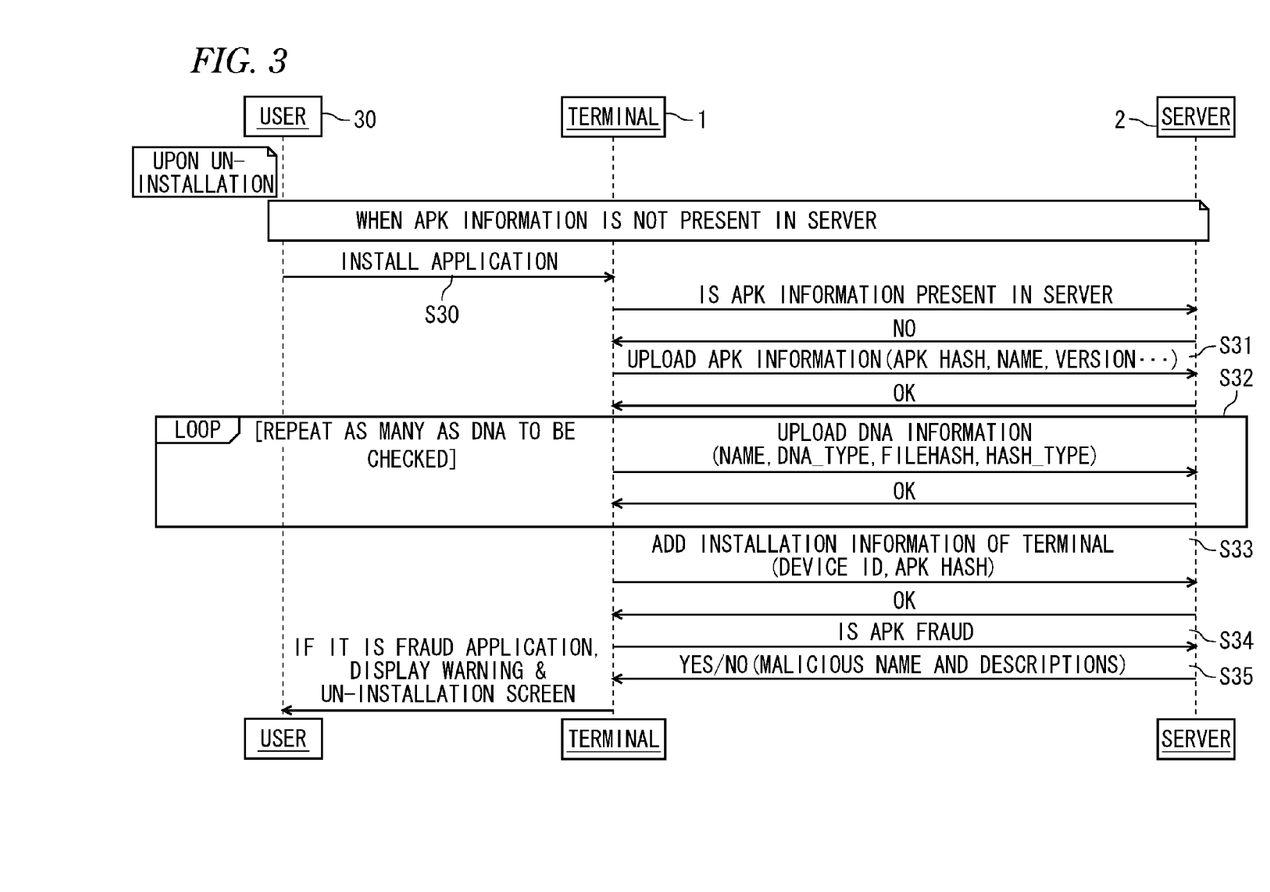
FIG. 3 is a sequence diagram when an application has not been registered.

FIG. 3 is a sequence diagram when an application has not been registered with the server 2.

When a user 30 installs an application (S30) on the terminal 1, the terminal 1 searches the application DB 28 for information about 'apk' (an Android application package). If the application has not been registered, No is notified. This corresponds steps from the installation notification step (S2) to the registration state notification step (S4) of the present invention.

Since the 'apk' information has not been registered, the feature value transmission unit 13 sends the 'apk' information to the server 2. In this case, the hash value of a file including 'apk', for example, a hash value using SHA1 as a hash function may be used as the 'apk' information. In addition, the 'apk' information may include a file name, a version, etc.

A method of calculating a feature value using a hash function is known, and the calculation is properly executed by the feature value calculation unit 12 at any timing before the feature value is transmitted.

In the present embodiment, the 'apk' information is uploaded (S31), and at the same time, a feature value regarding a part element (indicated by 'dna') included in 'apk' is transmitted (S32). Since a plurality of 'dna' is included in 'apk', the feature values as many as the number of 'dna' to be checked are repeatedly transmitted. The name and type 'dna_type' of 'dna', a hash value 'filehash', and the type of hash 'hash_type' are transmitted as the feature value regarding 'dna'.

From a viewpoint of a reduced load on the terminal, it is preferred that 'dna' having the greatest influence on a malicious action be previously defined as the subject of check and only a minimum necessary 'dna' be checked.

Such a process corresponds to the feature value transmission step (S6) and the fraud detection result recording step (S7) of the present invention.

Next, the addition of terminal installation information is executed (S33). That is, the identity number of the terminal 'device id' and the hash value of 'apk' are registered with the application DB 28. Such a process may be performed at this point of time and may be performed simultaneously with the installation notification step (S2).

The present invention is characterized in that the installation state of an application is stored in the application DB 28 on the basis of each terminal. Accordingly, the server 2 manages the application installation history of each terminal 1 and may provide information necessary for the terminal based on the history when a malicious action is subsequently checked. This is described later.

Furthermore, in the present embodiment, the application DB has been illustrated as being a single database, but the application DB may include a terminal-based application DB on which the installation state of each terminal has been recorded and a malicious action database on which a feature value associated with information about a malicious action has been recorded.

In such a case, a security-specialized company may be entrusted with the subject that manages the malicious action database, and only the terminal-based application DB may be managed by an organization, such as a company or a school.

Finally, in the present embodiment, whether or not 'apk' from the terminal 1 is malicious is checked (S34). The fraud detection information transmission unit 26 sends a result of the check as a response (S35). This corresponds to the fraud detection information transmission step (S9).

In the case of a fraud application, a warning is displayed, and a process for displaying a screen, prompting un-installation, to the user 30, is performed. This corresponds to the fraud countermeasures (S10).

Figure 4:
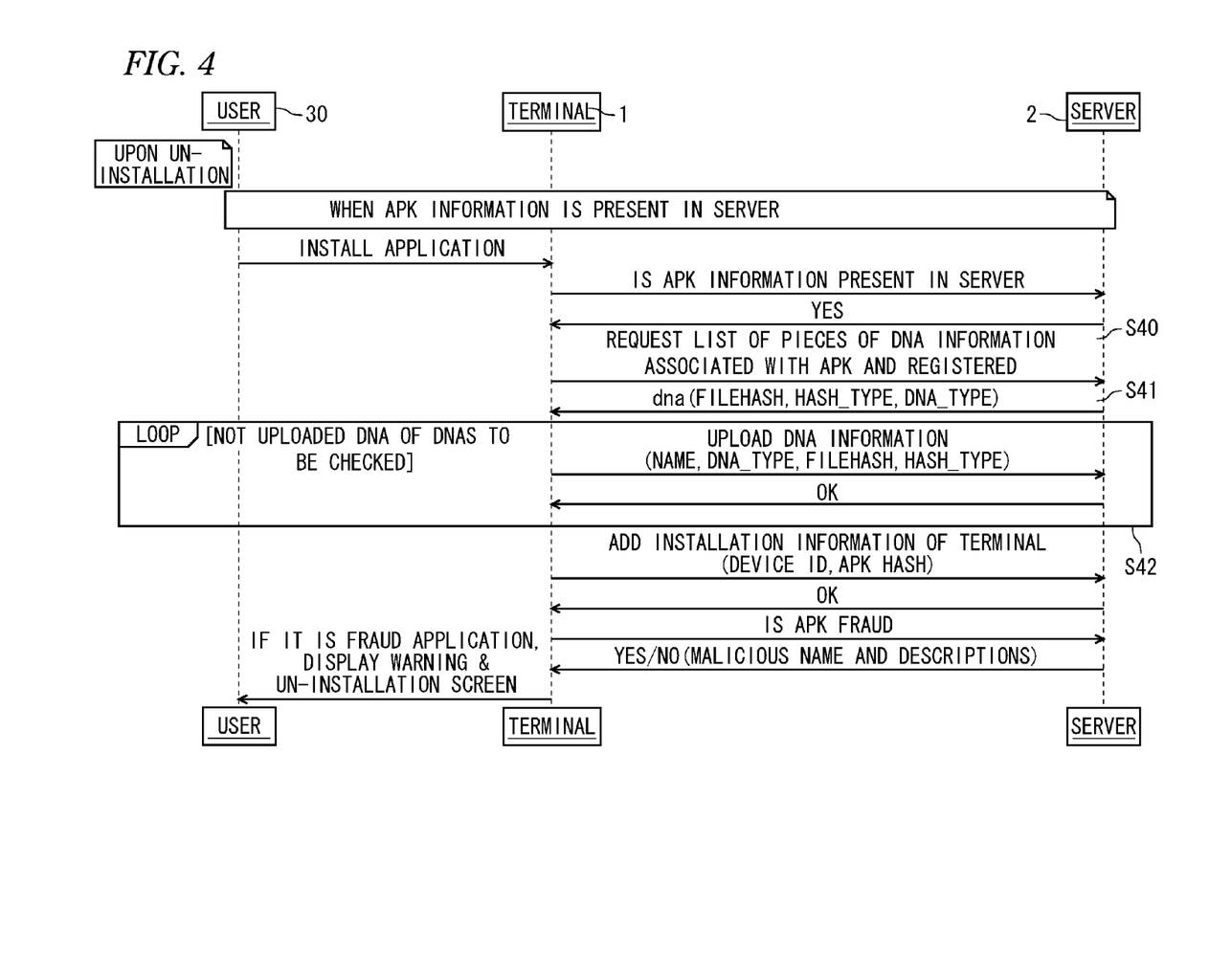
FIG. 4 is a sequence diagram when an application has been registered.

FIG. 4 is a sequence diagram when an application has been registered.

Like in the case of FIG. 3, whether or not 'apk' information is present on the server is checked. If the 'apk' information has been registered with the application DB 28, Yes is notified. As described above, if the 'apk' information has been registered, a list of pieces of information about 'dna' is requested because the information about 'dna' associated with the 'apk' information has been registered (S40).

The registration state notification unit 22 provides a list of the feature values of 'dna' recorded on the application DB 28 (S41). For example, filehash, hash_type, and dna_type that belong to the feature values stored above are provided.

If a feature value that has not been registered is present in the feature values, the feature value transmission unit 13 sends the feature value regarding 'dna' that has not been registered (S42), and the server 2 records the feature value on the application DB 28.

Subsequent processes are the same as those of FIG. 3, and thus a description thereof is omitted.

Figure 5:
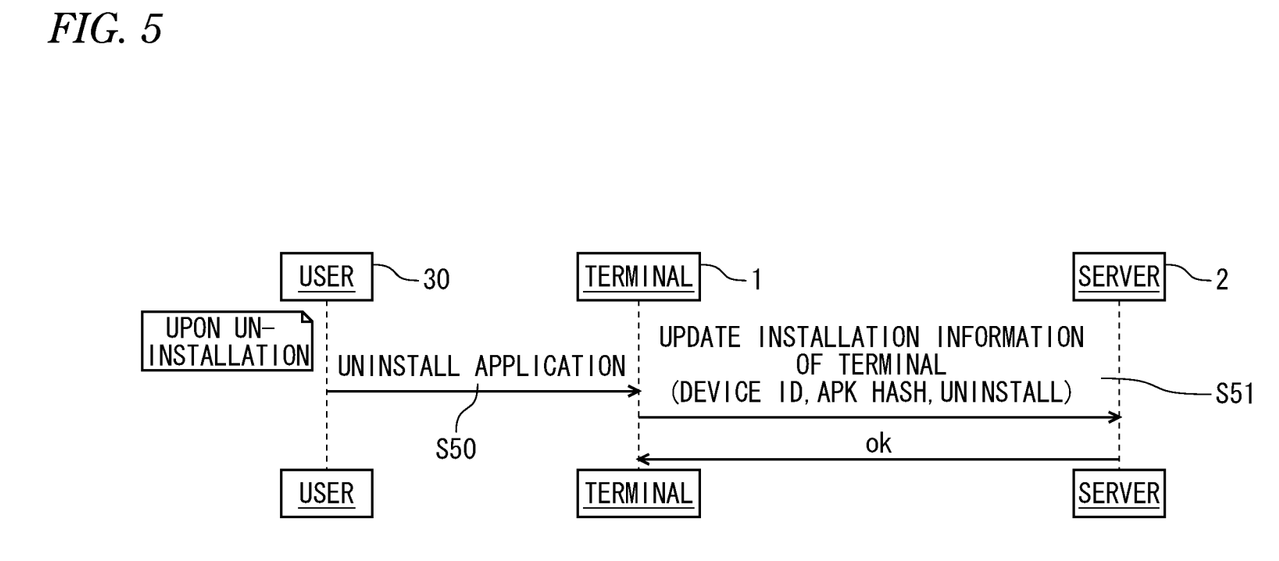
FIG. 5 is a sequence diagram when an application has been deleted on the terminal side.

FIG. 5 is a sequence diagram when an application has been deleted on the terminal side. When a user uninstalls an application (S50), the installation state detection unit detects such installation, and the installation notification unit 11 performs an installation information update process (S51). The installation information includes information 'uninstall' about uninstalled contents in addition to the identity number 'device id' of the terminal and the hash value 'hash' of the application.

The application DB 28 of the server 2 is updated.

In the present invention, as described above, even after an application was deleted from a terminal, information indicating that the application had been installed in the past and was then uninstalled is recorded on the server 2. Information about a deleted application is important because the application may frequently continue to execute malicious actions due to the modification of an OS or other applications although the application has been deleted.

Figure 6:
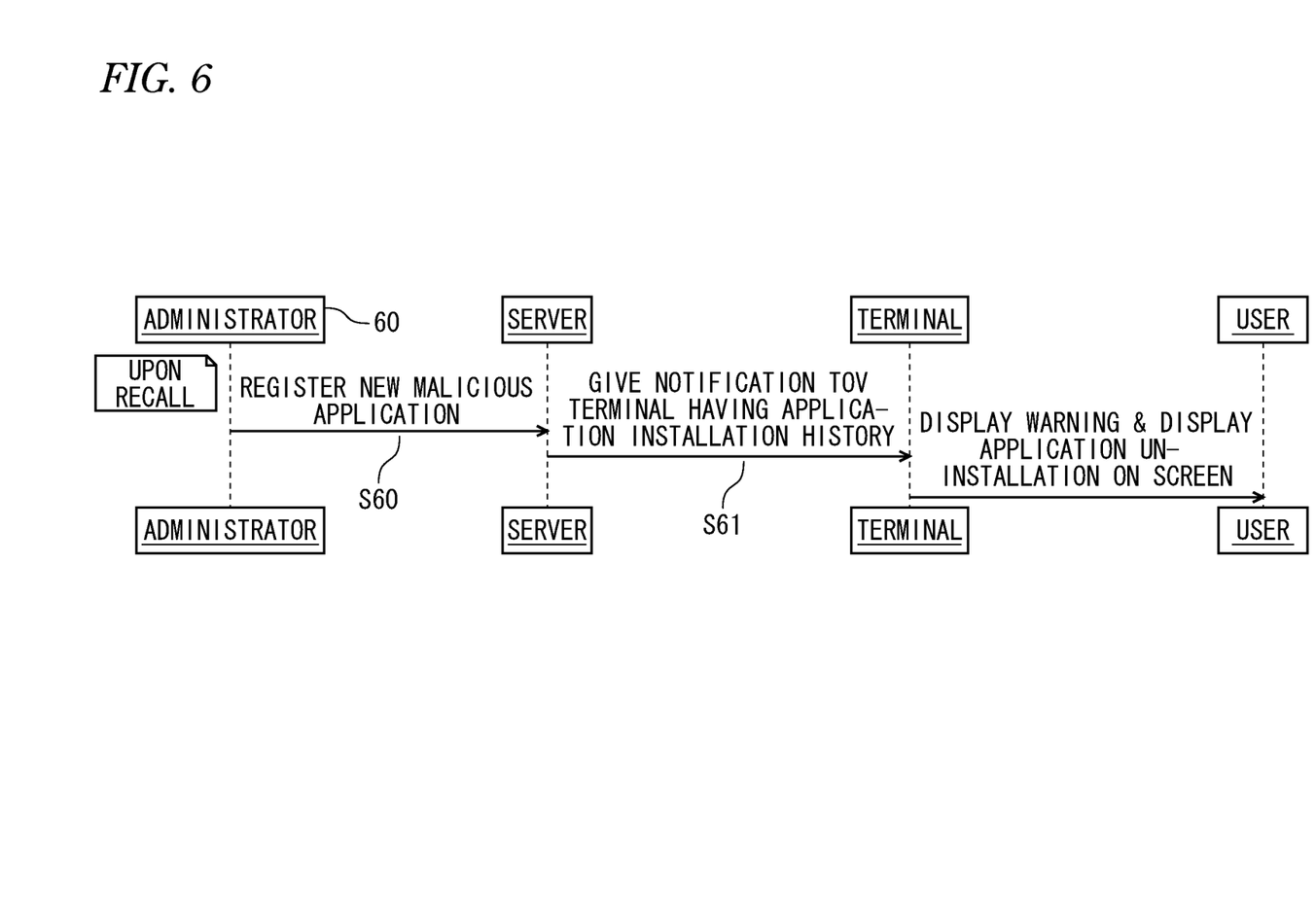
FIG. 6 is a sequence diagram when a detection result has been updated.

As an example using such an installation history, a sequence diagram when detection results are updated is shown in FIG. 6.

First, the administrator 60 of this system registers a new fraud application whose malicious action has been checked by the latest signature with the application DB 28 (S60). Alternatively, in the fraud detection result recording step (S7) of the present invention, the malicious action of the application may be detected and registered with the application DB 28.

In this case, the fraud detection information transmission unit 26 searches the application DB for an installation history and sends fraud detection information related to the terminal 1 having an installation record. In the same manner as that described above, the fraud detection information is processed by the fraud countermeasures unit 15 of the terminal 1.

The fraud detection information transmission unit 26 may change the notified fraud detection information depending on a current installation state. For example, in the case of an application indicative of a malicious action even after the application has been uninstalled, fraud detection information is transmitted. In contrast, in the case of an application that does not have a problem if the application is uninstalled, fraud detection information may not be transmitted.

Furthermore, fraud detection information may be changed by a combination of applications because all the applications of each terminal are recorded. For example, if a malicious action occurs only when an application A and an application B are installed, fraud detection information may be transmitted to only the terminal 1 on which both the applications have been installed.

Processing in the illustrated sequence diagram is the same as that described above. Finally, some embodiments in each processing step are described as examples.

First, in the feature value transmission step (S6), if information about an application is first registered with the server 2, not only a feature value, but the application itself may be uploaded onto the server 2. The server 2 may execute the fraud detection processing step (S7) on the uploaded application.

The terminal 1 may not send the application itself, but may notify the server 2 of the URL of an acquisition place so that the server 2 downloads the application from the URL.

In FIG. 3, the process (S34) for checking whether or not 'apk' is fraud may be repeatedly executed at some occasions, such as when the terminal 1 is started up, when an application is uninstalled, or when a smart phone or a mobile phone terminal enters a region other than its coverage, in addition to the occasions illustrated in the figure in order to improve accuracy of detection.

The feature value according to the present invention is not limited to the hash value.

First, the hash function is not limited to the SHA1, and a specific function, such SHA1, SHA256, or MD5, may be used as the type of hash. The hash function may be a hash function defined to be used for this system, and the type of hash may be changed depending on the subject on which hash is performed.

The subject used to calculate a hash value is the file of an application or element files that form a package of the application.

Preferred examples may include a 'dex' file (program code) included in the 'apk' package of Android, manifest (an XML file forming an application and it includes a package name, etc.), CERT (a signature file), and 'elf' (execution code of Linux (a registered trademark)).

If one 'apk' is included in the other 'apk', the hash value of the one 'apk' may be used. In the above description, the hash value is not limited to the hash value of a file itself, but the hash value of a part included in the file may be calculated. That is, the hash value of each class code within the 'dex' file may be used. In such a case, a single hash value is not taken from the 'dex' file, but the hash value of each class code included in the 'dex' file is calculated.

The feature value is not limited to the hash value, but metadata or a character string based on the file of the application or element files that form a package of the application may be used.

For example, a list of class names within the 'dex' file may be a feature value, and a part partially matching with the class name may be used.

In the above embodiment, the feature value calculation unit 12 has been provided in the terminal 1, but in the present invention, the feature value calculation unit 27 may be provided in the server 2. For example, if the server 2 detects the malicious action of an application irrespective of whether or not the application has been installed on the terminal 1 and records information about the malicious action on the database, the server 2 solely executes the downloading of the application, the calculation of feature values, and the detection of a malicious action and records the executed results on the application DB 28.

The invention claimed is:

1. A malicious application detection system comprising a terminal on which a user is able to properly install an application and a fraud detection server for detecting a malicious action of the application installed on the terminal, wherein:
the terminal comprises:
an installation state detection unit for detecting a change in an installation state of the application;
an installation notification unit for notifying the fraud detection server of information about the installed application when the installation state is changed;
a feature value calculation unit for calculating a specific feature value based on a file of the application or element files that form a package of the application;
a feature value transmission unit for notifying the fraud detection server of the information about the application and the feature value of the application;
a fraud detection information reception unit for receiving fraud detection information from the fraud detection server when the malicious action of the application is detected; and
an anti-malicious action unit for performing specific countermeasures in the terminal when the fraud detection information is received, and
the fraud detection server comprises:
an installation notification reception unit for receiving the information about the installed application from the installation notification unit of the terminal;
a feature value reception unit for receiving the feature value from the feature value transmission unit of the terminal;
a fraud detection unit for detecting a malicious action of a registered application within the server or externally obtaining and detecting the malicious action of the registered application;
a fraud detection result recording unit for registering the feature value, associated with the information about the malicious action, with an application DB; and
a fraud detection information transmission unit for sending fraud detection information to the terminal when the malicious action of the application is detected at least.

2. The malicious application detection system of claim 1, wherein:
the fraud detection server comprises:
an application information search unit for searching the application DB in order to check whether or not the notified information about the application has been registered; and
a registration state notification unit for notifying the terminal of a result of the check regarding whether or not the notified information about the application has been registered, and
wherein the feature value transmission unit of the terminal sends the information about the application and the feature value of the application to the fraud detection server depending on whether or not the information about the application has been registered with the fraud detection server.

3. The malicious application detection system of claim 1, wherein:
the fraud detection result recording unit of the fraud detection server records an installation state of an application in each terminal on the application DB in response to an installation notification from the terminal, and
the fraud detection information transmission unit of the fraud detection server sends fraud detection information even after an application is deleted from the terminal when a malicious action of the application is detected by the fraud detection unit.

4. The malicious application detection system of claim 1, wherein the application DB is configured to be separated into a terminal-based application DB on which an installation state is recorded according to each terminal and a malicious action database on which a feature value associated with information about a malicious action is recorded.

5. The malicious application detection system of claim 1, wherein
the fraud detection server comprises a feature value calculation unit for calculating a specific feature value based on a specific file of an input application or element files that form a package of the application,
the fraud detection unit detects the malicious action of the application, and
the fraud detection result recording unit registers the feature value associated with information about the malicious action with the application DB.

6. A terminal used in a malicious application detection system, comprising a terminal on which a user is able to properly install an application and a fraud detection server for detecting a malicious action of the application installed on the terminal, wherein the terminal comprises:
an installation state detection unit for detecting a change in an installation state of the application;
an installation notification unit for notifying the fraud detection server of information about the installed application when the installation state is changed;
a feature value calculation unit for calculating a specific feature value based on a file of the application or element files that form a package of the application;
a feature value transmission unit for notifying the fraud detection server of the information about the application and the feature value of the application;
a fraud detection information reception unit for receiving fraud detection information from the fraud detection server when the malicious action of the application is detected; and
an anti-malicious action unit for performing a specific countermeasures in the terminal when the fraud detection information is received.

7. A fraud detection server used in a malicious application detection system comprising a terminal on which a user is able to properly install an application and a fraud detection server for detecting a malicious action of the application installed on the terminal, wherein the fraud detection server comprises:
an installation notification reception unit for receiving the information about the installed application from the installation notification unit of the terminal;
a feature value reception unit for receiving the feature value from the feature value transmission unit of the terminal;
a fraud detection unit for detecting a malicious action of a registered application within the server or externally obtaining and detecting the malicious action of the registered application;
a fraud detection result recording unit for registering the feature value, associated with the information about the malicious action, with an application DB; and
a fraud detection information transmission unit for sending fraud detection information to the terminal when the malicious action of the application is detected at least.

8. A method of detecting a malicious application installed on a terminal using the terminal on which a user is able to properly install an application and a fraud detection server for detecting a malicious action of the application installed on the terminal, wherein the method comprises:
- an installation state detection step of detecting a change in an installation state of the application installed on the terminal;
- an installation notification step of notifying the fraud detection server of information about the installed application when the installation state is changed;
- a feature value transmission step of notifying the fraud detection server of a specific feature value based on a file of the application or element files that form a package of the application;
- a fraud detection result recording step of registering the feature value, associated with the information about the malicious action, with an application DB;
- a fraud detection information transmission step of sending fraud detection information to the terminal when the malicious action of the application is detected at least; and
- a fraud countermeasures processing step of performing specific countermeasures in the terminal when the fraud detection information is received.

9. The method of claim 8, wherein:
the installation notification step further comprises an application information search step of checking, by the fraud detection server, whether or not the information about the application received from the terminal has been registered with the application DB and a registration state notification step of notifying the terminal of a result of the check, and
in the feature value transmission step, the fraud detection server is notified of a specific feature value based on a file of an application that has not been registered or element files that form a package of the application.

10. The method of claim 8, wherein:
the fraud detection server records an installation state of an application on the application DB according to each terminal in response to an installation notification from the terminal, and
the fraud detection server sends fraud detection information to a terminal even after an application is deleted from the terminal when a malicious action of the application is detected.

11. The method of claim 8, wherein the fraud detection server calculates a specific feature value based on a specific file of an input application or element files that form a package of the application, detects the malicious action of the application, and registers the feature value associated with information about the malicious action with the application DB.

* * * * *